US012797844B2

(12) United States Patent
Pividori Gurgo

(10) Patent No.: US 12,797,844 B2
(45) Date of Patent: Nov. 17, 2026

(54) DEVICE FOR ASSAY SYSTEM, SYSTEM AND METHOD

(71) Applicants: BIOECLOSION, S.L., Cerdanyola del Valles (ES); UNIVERSITAT AUTÒNOMA DE BARCELONA, Bellaterra (ES)

(72) Inventor: Maria Isabel Pividori Gurgo, Caldes D'Estrac (ES)

(73) Assignees: BIOECLOSION, S.L., Cerdanyola del Valles (ES); UNIVERSITAT AUTÒNOMA DE BARCELONA, Bellaterra (ES)

( * ) Notice: Subject to any disclaimer, the term of this patent is extended or adjusted under 35 U.S.C. 154(b) by 464 days.

(21) Appl. No.: 18/292,179

(22) PCT Filed: Jul. 27, 2022

(86) PCT No.: PCT/EP2022/071078
§ 371 (c)(1),
(2) Date: Jan. 25, 2024

(87) PCT Pub. No.: WO2023/006817
PCT Pub. Date: Feb. 2, 2023

(65) Prior Publication Data
US 2024/0342702 A1 Oct. 17, 2024

(30) Foreign Application Priority Data
Jul. 28, 2021 (EP) .................................... 21382709

(51) Int. Cl.
*B01L 3/00* (2006.01)

(52) U.S. Cl.
CPC ..... *B01L 3/5023* (2013.01); *B01L 2200/0668* (2013.01); *B01L 2200/0689* (2013.01);
(Continued)

(58) Field of Classification Search
None
See application file for complete search history.

(56) References Cited

U.S. PATENT DOCUMENTS

| | | | |
|---|---|---|---|
| 2011/0318755 | A1 | 12/2011 | Piasio et al. |
| 2017/0328896 | A1 | 11/2017 | Luloh et al. |

(Continued)

FOREIGN PATENT DOCUMENTS

| | | | |
|---|---|---|---|
| EP | 3067116 | A1 | 9/2016 |
| JP | H04506116 | A | 10/1992 |

(Continued)

OTHER PUBLICATIONS

International Search Report and Written Opinion of International Application No. PCT/EP2022/071078, dated Sep. 8, 2022, 10 pages.

*Primary Examiner* — Xiaoyun R Xu
(74) *Attorney, Agent, or Firm* — Chrisman Gallo Tochtrop LLC

(57) ABSTRACT

A device for performing an assay system, the device including a chamber comprising a first opening, and a second opening; a liquid exit; a liquid absorbing pad adjacent to the chamber; an opening assembly for shifting the device between a closed position and an open position; a sealing element;

wherein:

in the closed position the sealing element covers the liquid exit such that a liquid is prevented from flowing out of the chamber;

and in the open position at least part of the liquid exit is uncovered by the sealing element and the device comprises a fluidic path between the chamber and the liquid absorbing pad through the uncovered part of the liquid exit.

20 Claims, 9 Drawing Sheets

(52) U.S. Cl.
CPC ... *B01L 2300/023* (2013.01); *B01L 2300/043* (2013.01); *B01L 2300/0645* (2013.01); *B01L 2300/069* (2013.01)

(56) References Cited

U.S. PATENT DOCUMENTS

| | | | |
|---|---|---|---|
| 2019/0329244 | A1 | 10/2019 | Ying et al. |
| 2020/0015725 | A1 | 1/2020 | Johnson et al. |

FOREIGN PATENT DOCUMENTS

| | | | |
|---|---|---|---|
| WO | 01/44803 | A2 | 6/2001 |
| WO | 2017/015172 | A1 | 1/2017 |
| WO | 2019/226971 | A1 | 11/2019 |
| WO | 2021030812 | A2 | 2/2021 |

DEVICE FOR ASSAY SYSTEM, SYSTEM AND METHOD

CROSS-REFERENCE TO RELATED APPLICATIONS

This is a National Stage application of PCT International Application PCT/EP2022/071078, filed on Jul. 27, 2022, which claims the benefit of European Patent Application EP21382709.0 filed on Jul. 28, 2021, both of which are incorporated herein by reference in their entirety.

FIELD OF THE INVENTION

The present invention relates to in vitro diagnostic IVD devices.

BACKGROUND ART

Invitro diagnostic IVD devices are currently being developed at a large scale, representing the 13.4% of the global MedTech market. Specifically, the Europe IVD market is expected to reach over $15.5 billion by 2024. Major drivers are the irruption of personalized medicine, increase of chronic pathologies needs and new markets on emerging countries. A long turnaround time in the diagnosis increases mortality, and the estimated medical costs for undiagnosed or misdiagnosed people. The consequences of the delay for diagnosing a disease have increased the development of some solutions for rapid tests. Such existing solutions present important drawbacks, since the rapid and easy-to-use tests show poor sensitivity and predictive value, and the gold standard methods must be performed in hospitals using benchtop equipment. The current immunological diagnostic tests can be classified into three categories: the first category includes quantitative tests which are tests based on immunoassays such as ELISA, which are performed in specialized clinical laboratories and the results feedback last several days. The second category includes qualitative tests, which are rapid diagnostic tests, RDT, based on immunochromatography, which show much poor sensitivity and the results are prone to interpretation of the practitioner and therefore subjective. Furthermore, the results from qualitative tests must be confirmed by a quantitative laboratory test. The third category includes analytical laboratory services, which are companies dedicated to diagnostic testing services ranging from routine blood tests, gene-based and molecular testing.

There is a need to reduce the time of in vitro diagnosis and to avoid constrained-resource settings at a point-of-need.

SUMMARY

In a first aspect of the present disclosure, there is provided a device for performing an assay, the device comprising

- an electrode;
- a first cover comprising
  - a chamber comprising
    - a first opening for adding magnetic particles and liquids into the chamber,
    - and a second opening for letting the magnetic particles and liquids contact the electrode placed in the device adjacent to the chamber;
  - and a sealing element;
- a second cover fitting the first cover, the second cover comprising
  - a liquid absorbing pad adjacent to the chamber;
- a liquid exit for letting the liquid exit the chamber;
- an opening assembly for shifting the device between a closed position and an open position, the opening assembly comprising
  - a first cooperating mechanism and a second cooperating mechanism wherein the first cover comprises the first cooperating mechanism and the second cover comprises the second cooperating mechanism;

wherein:

- the sealing element is for sealing the liquid exit;
- the liquid absorbing pad faces at least part of the liquid exit of the chamber in the open position of the device;

and wherein:

- in the closed position the sealing element covers the liquid exit such that a liquid is prevented from flowing out of the chamber through the liquid exit;
- and in the open position:
  - at least part of the liquid exit is uncovered by the sealing element and
  - the device comprises a fluidic path between the chamber and the liquid absorbing pad through the uncovered part of the liquid exit.

A device or cartridge according to the present disclosure is suitable for performing an assay or in vitro test. The device, also referred to as cartridge, includes a chamber for containing a sample and wherein the sample may comprise fluid clinical samples containing a biomarker for a disease or condition such as blood, serum, plasma, or any other sample in a liquid form including food, beverages, environmental samples containing a contaminant. A whole range of applications may be exploited in food safety, including small pollutants (pesticides, antibiotics, additives, and allergens) and pathogens, as well as clinical applications including detection of biomarkers of malaria, celiac disease, *mycobacterium*, and AIDS, among others. Such sample may further comprise magnetic particles attached to a desired molecular or biological receptor, i.e., peptide, antibody, DNA, oligonucleotide or any other molecule which is capable of specifically react or attach a biomarker or a target in the sample. One of the advantages of the device of the disclosure is that, due to the opening assembly, the chamber may be used as a container in which the liquids may stay for reaction or may be removed by capillarity by the absorbing pad, for example for washing, depending on the position of the opening assembly. In the closed position, the sealing element, which may comprise a watertight O-ring or sealing gasket which may comprise a membrane or a gasket, seals or tight-closes the liquid exit, thereby preventing the flow of liquid out of the chamber. The liquid exit may be understood as an orifice or a slot or as a permeable surface suitable for allowing liquid in the chamber flow towards the absorbing pad. In the open position, the sealing element uncovers at least part of the liquid exit forming thereby a fluidic path between the chamber and the liquid absorbing pad, and the liquid absorbing pad removes or drains the liquid in the chamber by capillarity. Such absorbing pad may be configured with a predetermined pore size or may be any type of commercial absorbing paper or a sponge. The size of the absorbing pad may be suitable for absorbing any predetermined quantity of liquid, which may comprise liquid sample and/or washing buffer. The absorbing pad is positioned adjacent to the chamber, meaning that the absorbing pad may be close to the chamber for allowing the formation of the fluidic path. In some examples the absorbing pad surrounds or covers at least part of the liquid exit, in some examples the absorbing pad faces the liquid exit, in some examples the absorbing pad is over the liquid exit.

An advantage of the device of the present disclosure compared to, for example an ELISA system or any microplate immunoassay, is that the pipetting for removing the excess of liquid is eliminated.

The device is composed of two cooperating parts which move relative to each other due to the opening assembly made of the first cooperating mechanism and the second cooperating mechanism.

In some examples, the first cooperating mechanism and the second cooperating mechanism are moveable relative to each other such that the second cover is movable towards and from the first cover to shift between the closed position and the open position. The cooperating mechanisms may be, for example, a rail and a wheel which rotates over the rail or may be a groove and a protrusion sliding through or along the groove or may be a mechanism comprising a hinge for opening and closing the device.

In some examples, the first cooperating mechanism may form a threaded coupling with the second cooperating mechanism such that the second cover may be threaded onto the first cover and unthreaded from the first cover to shift between a closed position and an open position.

The configuration of the cooperating mechanisms may depend on requirements of use and each of the configurations may provide different advantages for a final user, and advantages during manufacture. This example provides for a second cover configured to be threaded on the first cover. The threaded coupling may comprise a helical groove and a protrusion. A further example may comprise, for example, a flange or protrusion sliding through or along a groove may be simpler to manufacture than the threaded coupling. For example, a thread may allow a final user to apply controlled openings and closings of the device compared to a protrusion-and-groove mechanism and to avoid thereby any undesired movement of a sample contained in the chamber.

In some examples, the device may comprise an electrode receiving slot adjacent to the chamber in a position where, when the chamber comprises a sample or liquid, the sample or liquid is enabled, under the force of gravity, to flow through the second opening towards the electrode receiving slot. The position where, when the chamber comprises a sample or liquid, the sample or liquid is enabled, under the force of gravity, to flow through the second opening towards the electrode receiving slot may be, in some examples, a position below the chamber when the device is in a standing or upright position. In such examples, the standing or upright position may be understood as a position where, considering a reference plane XZ for placing the device, the first opening is in a higher position in an axis Y perpendicular to the plane XZ than the second opening, and the second opening is in a higher position in an axis Y perpendicular to the plane XZ than the electrode receiving slot; in such position, the electrode receiving slot is below the chamber, such that, in use, when the device is positioned on a standing position and the sample or liquids are inserted into the chamber, the sample or liquids fall or drain by the force of gravity towards the electrode receiving slot.

The electrode receiving slot may allow fix-positioning an electrode in the device, such that the sample to be analyzed may be put in contact with the electrode. The electrode receiving slot allows therefore correct positioning of an electrode for using the device or cartridge of the present disclosure. The electrode receiving slot may be provided with fixing means, such as flaps or adhesive to provide stability to the electrode. This is advantageous for avoiding detachment of the electrode from the device when the electrode is inserted into and removed from a reader. An advantage compared to qualitative tests, or rapid diagnostic tests, RDT, based on immunochromatography, is that a non-visual interpretation is obtained since the electrode is inserted in a reader which can provide a quantitative result.

In some examples, the device may comprise a magnet-slot next to the chamber in a position where, when the chamber comprises a magnetic particle and a magnet is positioned in the magnet-slot, the magnetic particle is enabled, under a magnetic field generated by the magnet, to move through the second opening towards the magnet. The magnet-slot allows correct positioning of a magnet for using the device or cartridge of the present disclosure. The device or cartridge of the present disclosure may, therefore, be used for a magneto-actuated assay. In some examples where the device is used with an electrode, for example positioned in an electrode slot, and used with a magnet positioned in the magnet-slot, the electrode may be between the magnet and the magnetic particles such that the magnetic particles contact and are fixed to the electrode while attracted towards the magnet. Continuing with reference to the plane XZ, the magnet slot may be below the electrode receiving slot in the axis Y perpendicular to the plane XZ, such that, in use, the liquid falls or drains by the force of gravity towards the electrode receiving slot and the particles within the liquid are in turn attracted towards a magnet provided in the magnet receiving slot. This configuration provides the advantage of retaining the particles on an electrode provided in the electrode receiving slot even if the liquid part of the sample is absorbed by the liquid absorbing pad in an open position of the device.

The magneto-actuated assay may be performed by adding magnetic particles into the sample. The device or cartridge of the present disclosure are therefore appropriate for use in a method for detecting any type of target or biomarker in the sample once a particular molecular or biological receptor i.e., peptide, antibody, DNA, oligonucleotide or any other molecule which is capable of specifically react or attach a biomarker or a target, is immobilized on the magnetic particle. For example, a simple and rapid method for detecting a virus or bacteria may comprise immobilizing antibody specific to the bacteria or virus on a magnetic particle or magnetic nanoparticle. The magnetic particle with the immobilized antibody may be added into the chamber of the device or cartridge. A sample comprising an analyte or target, for example a blood sample, may also be added into the chamber such that the molecular or biological receptor attached to the particle may interact with the analyte or target by affinity reaction. A magnet in the device or cartridge or next to the device or cartridge may attract the magnetic particles attached to the analyte or target of interest towards an electrode through the second opening. In such position, the device or cartridge may be shifted to the open position so that excess of liquids of the sample may be drained and thus absorbed by the absorbing pad while the magnetic particles are retained or fixed contacting at least a surface of the electrode. Once the excess of liquids are absorbed, washing steps can be also included while the cartridge is in open position. In any case, when the liquid is adsorbed, the device or cartridge may be shifted to the closed position and a readout reagent may be combined with the attracted magnetic particles in the closed position. The electrode may be inserted into a transducer or reader which may perform the measurements.

The device or cartridge of the present disclosure allows therefore an electrode or magnetic device to perform a quantitative readout of a sample while a liquid excess of the sample and possible reagents may be removed by capillarity by the liquid absorbing pad.

A professional user may acquire a device or cartridge of the present disclosure without an electrode; the professional user may insert a required electrode into the device or cartridge, depending on the analysis they may accomplish. A nonprofessional user may acquire a system of the present disclosure, comprising a device or cartridge of the present disclosure and an electrode; in such case, the nonprofessional user simply adds a sample into the device or cartridge without a need for special knowledge of a particular suitable electrode for the analysis they may perform.

In a second aspect of the disclosure there is provided an assay system comprising a device or cartridge according to the first aspect of the invention and a reader. A reader may provide signal changes in the electrode or electrode cell as a readout.

In some examples the assay system of the disclosure further comprises a magnet. The magnet is positioned such that, when the device or cartridge is coupled to a reader, the magnet is placed next to the chamber in a position where, when the chamber comprises a sample comprising magnetic particles, the magnetic particle is enabled, under a magnetic field generated by the magnet, to move through the second opening towards the magnet. In such examples, either the device or cartridge may comprise the magnet or the reader may comprise the magnet.

In some examples the cartridge or device may comprise a communication interface for communicating with a portable device. The portable device may be a tablet or a portable electronic device or a smart phone or mobile phone configured to receive measurements from a reader or transducer.

The device or cartridge and the system of the present disclosure may be understood as tools for in vitro Diagnostics, IVD, which may combine the potential of magnetic particles with a standard tablet or smartphone by a connection through an interface, such as a USB cable or a wireless interface.

The device or cartridge of the present disclosure may be of a single use, and in the case of detecting a disease, the device may provide quantitative readout to detect a biomarker of the disease in whole blood, serum or plasma. The device of the present disclosure may be used by healthcare professionals for the rapid diagnosis of a disease.

In a third aspect of the disclosure there is provided a method for performing an assay or in vitro test, the method comprising at least the following steps:

- providing an assay system according to the second aspect of the disclosure;
- providing the device or cartridge in the closed position;
- adding a sample to be analyzed through the first opening into the chamber, wherein at least part of the sample is in a liquid state;
- shifting the device or cartridge to the open position, where at least a part of the liquid exit is uncovered by the sealing element and a fluidic path is formed between the chamber and the liquid absorbing pad through the uncovered part of the liquid exit;
- letting the liquid part of the sample flow through the fluidic path to be at least partially removed by the liquid absorbing pad;
- shifting the device to the closed position;
- adding a readout reagent into the chamber;
- reading the resulting sample by an electrode reader.

The method of the present disclosure allows switching between an open and closed position of the cartridge of the present disclosure to add sample and reagents into the chamber for subsequent analysis by a reader. A method of the present disclosure is advantageous since a simple use is provided for enabling a user to remove excess liquid from a sample to be analyzed.

In some examples, the method comprises providing a system with a magnet, adding a sample comprising magnetic particles and the step of letting the liquid part of the sample flow through the fluidic path to be at least partially removed by the liquid absorbing pad is performed while the particles are attracted by the magnet. The sample is said to be drained by the absorbing pad. In these examples the method provides for a simple method for removing liquids which may comprise washing liquids or buffers. While the excess liquid is being absorbed, the targets or analytes of interest are attracted towards the magnet and the electrode avoiding their flow towards the absorbing pad. In such examples, the electrode may be free of molecular or biological receptor since they are immobilized on the magnetic particles.

In some examples of the method, after adding a sample and before shifting the device or cartridge to the open position a washing buffer is added into the chamber for washing the sample. For example, in the case of having a sample of a density not appropriate to be absorbed by capillarity by the absorbing pad, the washing buffer may allow an improved washing of such sample.

In the open position, washing steps can be also added, letting the liquid part of the washing solution drain and flow through the fluidic path to be at least partially removed by the liquid absorbing pad. For example, a washing solution may be added into the chamber before shifting the device or cartridge to the closed position and thus before adding a readout reagent into the chamber.

DESCRIPTION OF THE DRAWINGS

Non-limiting examples of the present disclosure will be described in the following, with reference to the appended drawings, in which.

DETAILED DESCRIPTION

In the following description, specific details are set forth in order to provide a thorough understanding of the present invention.

Figure 1A:
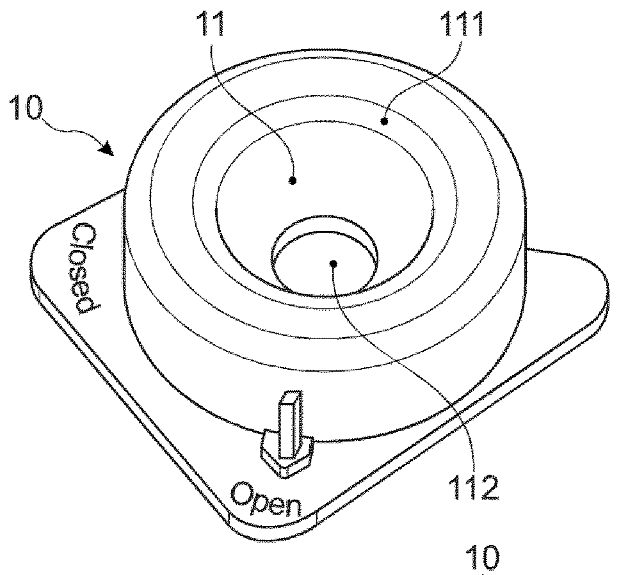
FIG. 1A is an example representation of a device or cartridge according to the invention.

FIG. 1A is an example representation of a device or cartridge 10, 10, according to the disclosure. FIG. 1A shows a chamber 11 comprising a first opening 111 and a second opening 112.

Figure 1B:
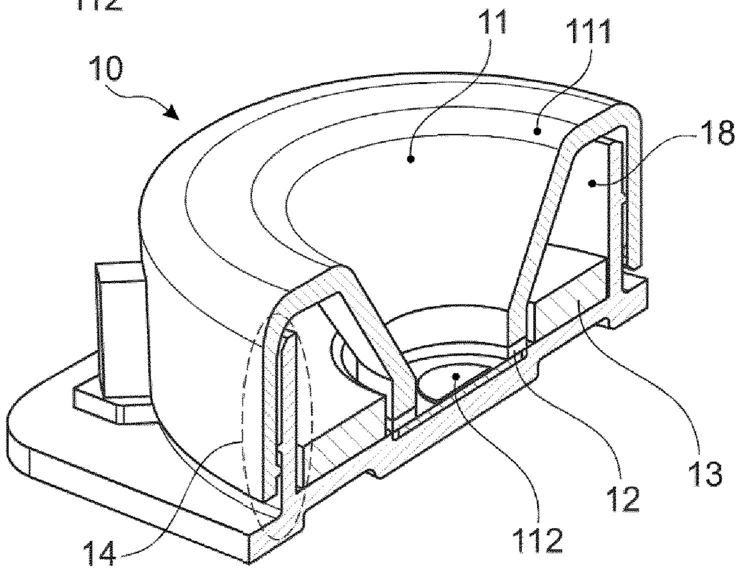
FIG. 1B is an example representation of a section of a device or cartridge according to the invention in a closed position.

FIG. 1B is an example representation of a section of a device 10 or cartridge 10 according to the invention in a closed position. FIG. 1B shows the device 10 comprising a chamber 11 as a cavity 11, the cavity 11 comprising a first opening 111 in a higher height and a second opening 112 in a lower height. FIG. 1B also shows the sealing element, sealing gasket or O-ring 12, the absorbing pad 13 and an opening assembly 14 in the closed position.

Figure 1C:
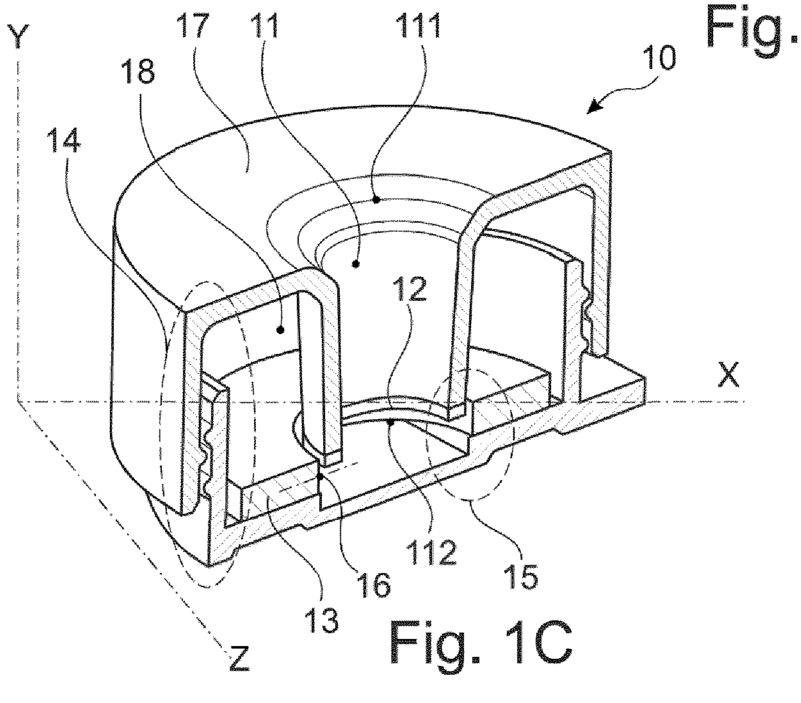
FIG. 1C is an example representation of a device or cartridge according to the invention in an open position.

FIG. 1C is an example representation of a device or cartridge according to the invention in an open position on a plane XZ. FIG. 1C shows the device 10 comprising a chamber 11 comprising a first opening 111, and a second opening 112. FIG. 1C also shows the sealing element 12, the absorbing pad 13, the opening assembly 14 in the open position and a liquid exit 15. The liquid exit 15 is the opening formed between the cover or casing 17—comprising the chamber 11—and the base of the device. The device or cartridge 10 is shown on a standing or upright position where, considering the reference plane XZ, the first opening 111 is in a higher position in an axis Y perpendicular to the plane XZ than the second opening 112. In use, the upright position allows the liquids to be entered or inserted through the first opening 111; the liquids fall by gravity into the chamber and rest on the base of the chamber. In the closed position the liquid exit 15 is closed and sealed by the sealing element 12, so that the sealing element 12 prevents the liquid from exiting the chamber 11, and in the open position the liquid exit 15 is open, a fluidic path 16 is formed, letting the liquid exit the chamber 11 towards the liquid absorbing pad 13 along the fluidic path 16.

As shown by the different FIGS. 1A, 1B and 1C, the device or cartridge 10 may be used for an assay system, the device or cartridge comprising a chamber 11, wherein the chamber 11 comprises a first opening 111 for adding magnetic particles and liquids into the chamber and a second opening 112 for letting the magnetic particles and liquids contact an electrode adjacent to the chamber. The device or cartridge comprises a liquid exit 15 suitable for removing liquids from the chamber towards the absorbing pad 13. The sealing gasket 12 is configured to cover at least the liquid exit 15 of the chamber 11 for preventing the flowing of a liquid through the liquid exit in the closed position. The liquid absorbing pad 13 is positioned adjacent to the chamber. The opening assembly 14 helps shifting the device between a closed position and an open position, wherein, as shown in the FIG. 1B in the closed position the sealing element 12 covers the liquid exit, such that in FIG. 1B the liquid exit 15 is closed or locked or sealed. A liquid is thus prevented from flowing out of the chamber 11 in the closed position. As shown in FIG. 1C in the open position at least part of the liquid exit is uncovered by the sealing element, specifically FIG. 1C shows a completely uncovered liquid exit 15 and the fluidic path 16 is formed between the chamber 11 and the liquid absorbing pad 13 through the uncovered part of the liquid exit 15. Although the absorbing pad 13 is shown in FIGS. 1A, 1B, 1C having a specific width, the absorbing pad 13 may completely occupy the available space 18 shown in the FIG. 1B, for providing an improved absorbing capacity. By modifying the width or size of the absorbing pad, different amounts of liquid may be absorbed by the absorbing pad.

Figure 2:
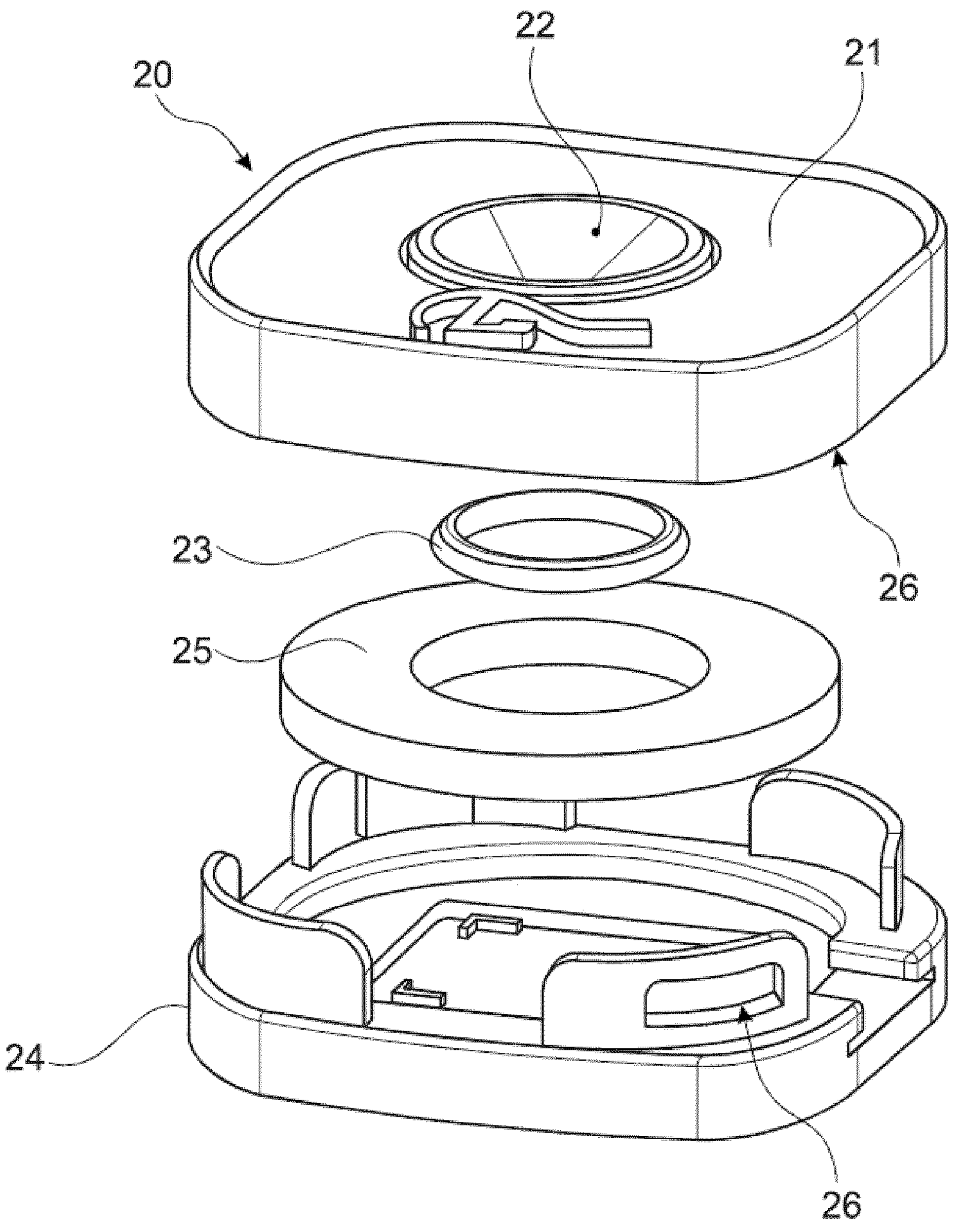
FIG. 2 shows a representation of a dismantled cartridge chamber.

FIG. 2 shows a representation of a dismantled cartridge or device 20 wherein a first cover 21 comprises the chamber 22 and the sealing element 23 shown detached from the first cover in FIG. 2. When the cartridge 20 is not dismantled, the first cover 21 fits a second cover 24, the second cover comprising the liquid absorbing pad 25. When not dismantled, the liquid absorbing pad 25 faces at least part of the liquid exit, wherein the liquid exit is the orifice or slot created in an open position by the separation of the first cover from the second cover in the example of FIG. 2. In the closed position, the sealing element 23 cuts the fluidic path between the chamber 22 and the liquid absorbing pad 25, thus preventing the liquid from exiting the chamber. The opening assembly 26 comprises a first cooperating mechanism and a second cooperating mechanism (not shown) wherein the first cover 21 comprises the first cooperating mechanism and the second cover 24 comprises the second cooperating mechanism.

Figure 3A:
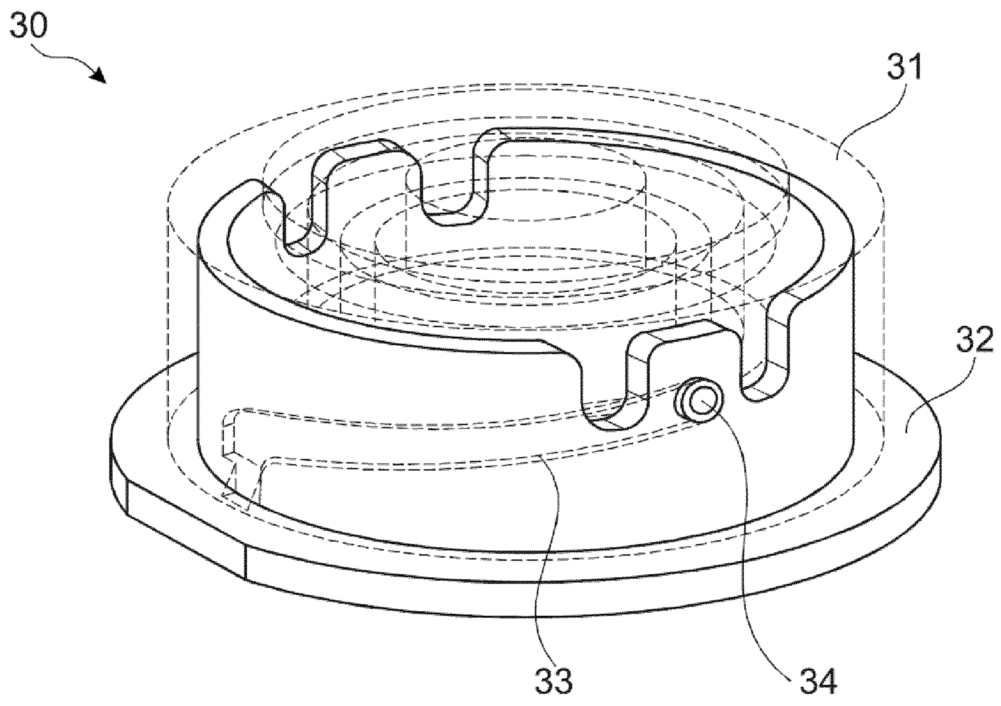
FIGS. 3A and 3B show an example cartridge chamber in the closed and in the open positions.
Figure 3B:
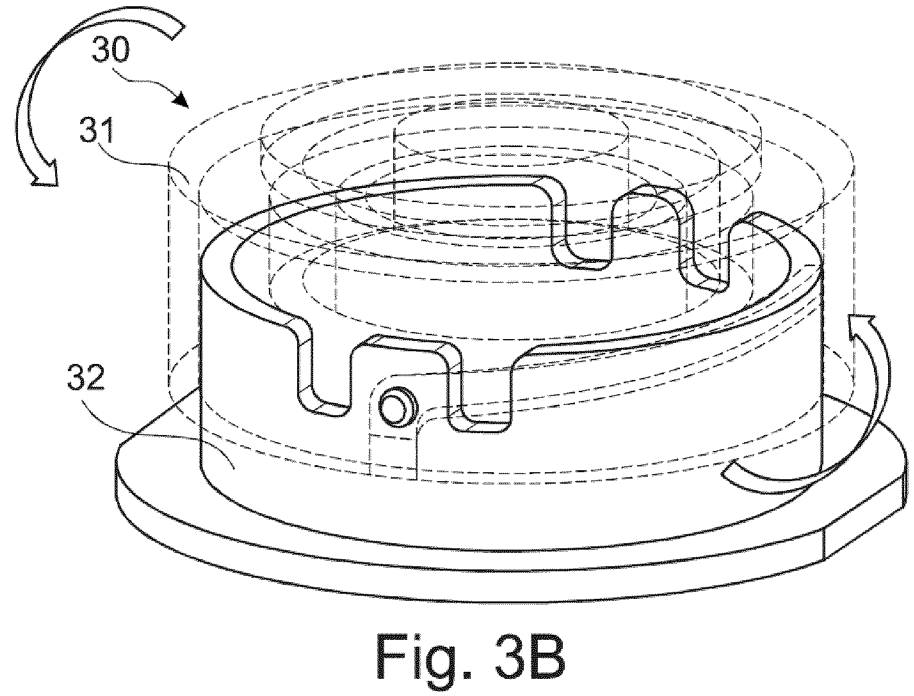

FIGS. 3A and 3B show an example cartridge or device 30 in the closed and in the open positions. In the closed position the first cover 31 and the second cover 32 are closer and form a more compact chamber 30 than in the open position. FIG. 3 shows the first cooperating mechanism 33 and the second cooperating mechanism 34 moveable relative to each other such that the cartridge chamber 30 shifts between the closed position and the open position when the first cover 31 and the second cover 32 get closer or separated between them. Additionally, the first cooperating mechanism 33 and the second cooperating mechanism 34 of the cartridge 30 form a threaded connection or coupling such that one of the second cover 32 or the first cover 31 is threaded onto the first cover 31 or the second cover 32 and unthreaded from the first cover 31 or from the second cover 32 to shift between the closed position and the open position. In particular, the first cooperating mechanism 33 and the second cooperating mechanism 34 of the cartridge or device 30 are moveable relative to each other such that the first cover 31 is movable towards and from the second cover 32 to shift between the closed position and the open position. In the example cartridge 30 the first cooperating mechanism 33 forms a thread with the second cooperating mechanism 34 such that the first cover 31 is threaded onto the second cover 32 and unthreaded from the second cover 32 to shift between a closed position and an open position. In FIG. 3 the first cooperating mechanism 33 is a grove 33 and the second cooperating mechanism 34 is a protrusion 34 which runs or slides along the groove 33. The cooperating mechanism in FIG. 3 may also comprise a bayonet coupling.

Figure 4B:
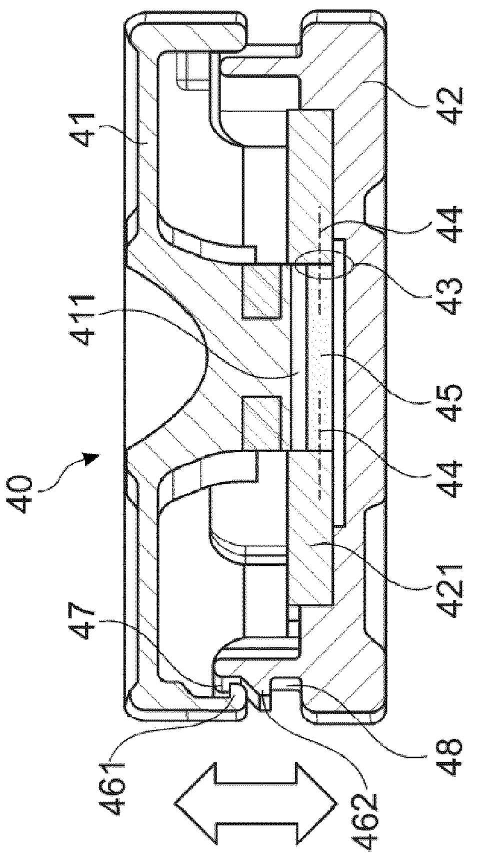
FIGS. 4A and 4B show a further example of the cartridge chamber in the closed and in the open positions respectively.
Figure 4A:
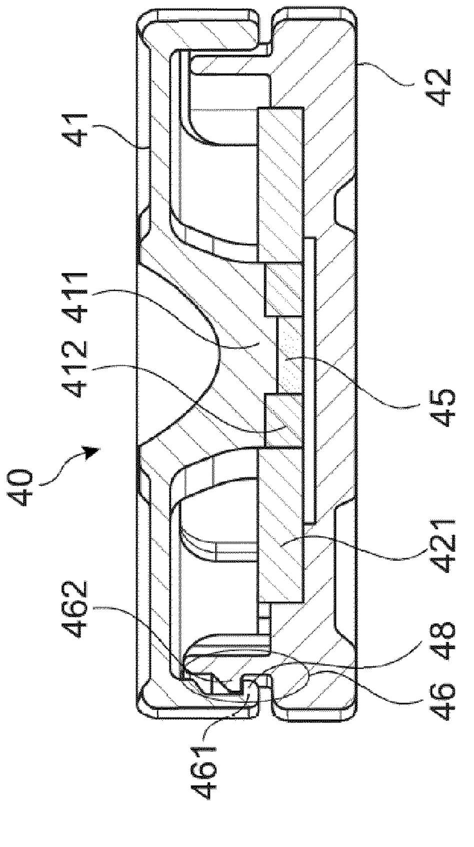

FIGS. 4A and 4B show a further example of cartridge 40 in the closed and in the open positions respectively. The cartridge 40 comprises a first cover 41 comprising the chamber 411 and the sealing element 412. The first cover 41 fits a second cover 42. The second cover 42 comprises a liquid absorbing pad 421, wherein the liquid absorbing pad 421 faces the liquid exit 43 (seen unsealed in FIG. 4B). In this example, the liquid exit 43 is the hole or cavity 43 formed between the first cover 41 and the second cover 42 in the open position. The liquid exit 43 is covered by the sealing element 412 in the closed position and uncovered leaving a fluidic path 44 between the chamber and the absorbing pad 421 in the open position. Besides, in the closed position, the sealing element 412 cuts the fluidic path 44 between the chamber 411 and the liquid absorbing pad 421, thus preventing the liquid from exiting the chamber. As seen, in the closed position—FIG. 4A—a liquid 45 is retained in the chamber 411, whereas in the open position—FIG. 4B—the liquid 45 flows along the fluidic path 44 and is absorbed by the absorbing pad 421. Additionally, an opening assembly 46 comprises a first cooperating mechanism 461 and a second cooperating mechanism 462 wherein the first cover 41 comprises the first cooperating mechanism 461 and the second cover 42 comprises the second cooperating mechanism 462. The first cooperating mechanism 461 and the second cooperating mechanism 462 of cartridge or device 40 are moveable relative to each other such that the first cover 41 and the second cover 42 are movable relative to each other to shift between the closed position and the open position. In particular, the cooperating mechanisms in the cartridge or device 40 are first locking tab 461 and second locking tab 462. A user may raise the first cover 41 up from the second cover 42 and fix the first cover 41 in the open position positioning the first locking tab 461 on the second locking tab 462 on point 47, and a user may lower the first cover 41 down towards the second cover 42 and fix the first cover 41 in the closed position positioning the first locking tab 461 below the second locking tab 462 on point 48.

Figure 5:
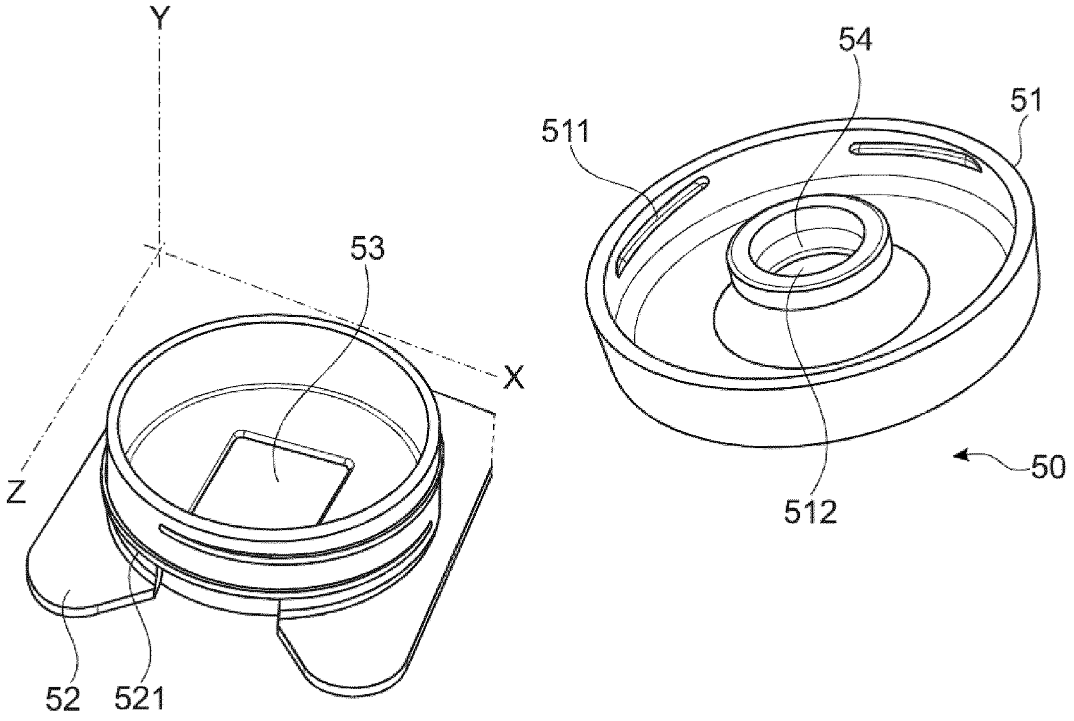
FIG. 5 shows an example of the cartridge.

FIG. 5 shows an example embodiment of a cartridge 50. The cartridge or device 50 comprises a first cover 51 and a second cover 52. FIG. 5 shows the first cover and the second cover detached. The first cover 51 comprises a chamber 54, as in previous examples, defined in the inner cavity of a funnel delimited by a first opening—not shown—and a second opening 512. As seen in FIG. 5, the first cooperating mechanism 511 and the second cooperating mechanism 521 form a threaded connection or coupling such that the first cover 51 can be threaded onto the second cover 52. The first cooperating mechanism 511 and the second cooperating mechanism 521 are two helical protrusions. The cartridge 50 comprises an electrode receiving slot 53, which results adjacent to the chamber 54 when first cover 51 and second cover 52 are attached or threaded. The electrode receiving slot 53 is in a position where, in operation when the second cover 52 acts as a base, and when the chamber 54 comprises a liquid in the closed position, the liquid is enabled, under the force of gravity, to flow through the second opening towards the electrode receiving slot in the closed position. If an electrode is positioned in the electrode receiving slot 53, then the electrode can interact with the liquid and the electrode may be read for determining the composition of the liquid or for detecting components thereof. Once the electrode is analyzed, the cartridge or device 50 can be shifted to the open position such that the liquid may be absorbed by a liquid absorbing pad comprised in the cartridge 50 (not shown in the FIG. 5).

As seen in the particular example of FIG. 5, the position where, when the chamber comprises a sample or liquid, the sample or liquid is enabled, under the force of gravity, to flow through the second opening towards the electrode receiving slot is a position below the chamber 54 when the device is in a standing or upright position. In such example, the standing or upright position is the position where, considering the reference plane XZ for placing the device, the first opening is in a higher position in an axis Y perpendicular to the plane XZ than the second opening 512, and the second opening 512 is in a higher position in an axis Y perpendicular to the plane XZ than the electrode receiving slot 53; in such position, the electrode receiving slot 53 is below the chamber 54, such that, in use, when the device is positioned in the standing position and the sample or liquids are inserted into the chamber 54, the sample or liquids fall by the force of gravity towards the electrode receiving slot 53.

Figure 6:
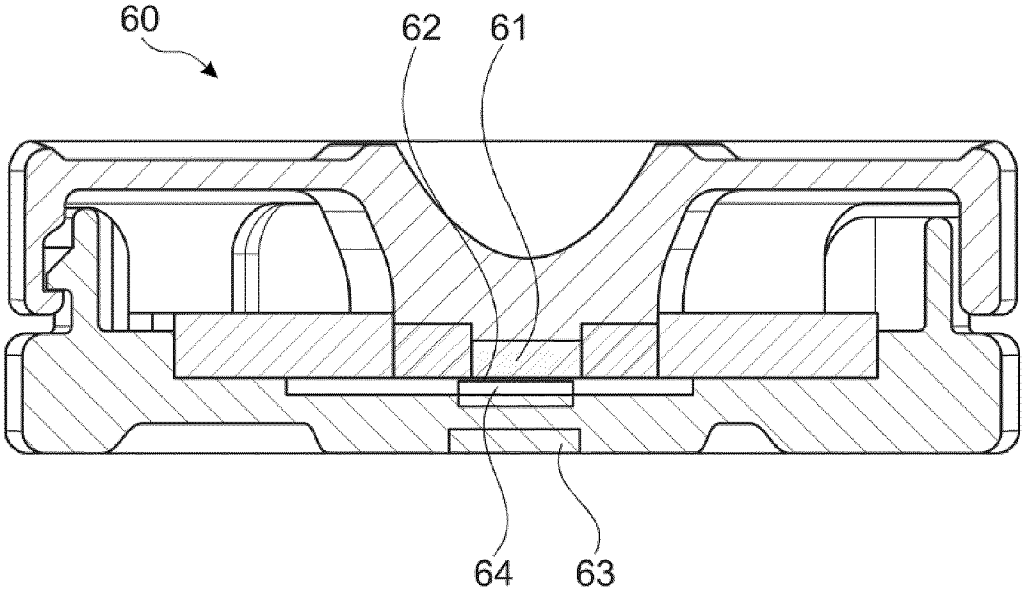
FIG. 6 shows a device or chamber in the closed position comprising a liquid retained in the chamber.

In an embodiment, a cartridge or device may comprise a magnet-slot next to the chamber in a position where, when the chamber comprises a magnetic particle and a magnet is positioned in the magnet-slot, the magnetic particle is enabled, under a magnetic field generated by the magnet, to move through the second opening towards the magnet. In the examples above, in the cartridge or device 10 a magnet may be comprised, for example, in a magnet-slot (not shown in the figure) below the second opening 112, next to or close to the chamber 11 in a position where, when the chamber comprises a magnetic particle in a liquid and a magnet is positioned in the magnet-slot, the magnetic particle is enabled, under a magnetic field generated by the magnet, to move through the second opening 112 towards the magnet. In the cartridge or device 20, the magnet-slot may be in the second cover 24. In the cartridge or device 30, a magnet-slot may be comprised on the base of second cover 32 on the opposite side from the side facing the chamber. In the cartridge or device 40, a magnet-slot may be comprised in the second cover 42, under the surface facing the chamber. In cartridge or device 50, the magnet-slot may be in the second cover 52 under de electrode receiving slot 53 such that, when a magnet is comprised in the magnet-slot and the chamber 54 comprises a liquid in the closed position, any magnetic particle in the liquid is attracted towards the magnet such that an electrode comprised in the electrode receiving slot can be put into contact to any analyte or target of interest attached to the magnetic particle. FIG. 6 shows a cartridge or device 60 in the closed position comprising a retained liquid 61 in the chamber. The cartridge or device 60 comprises a magnet-slot 63. In the case where the liquid 61 comprises magnetic particles and the magnet slot comprises a magnet, the particles are attracted under the magnetic field created by the magnet and are in contact to a surface between the second opening and the magnet. In the case where the cartridge or device comprises an electrode in an electrode receiving slot 62, the electrode is put into contact to the magnetic particles through the second opening 64 and the electrode can be used for reading an analyte or target attached to the particles.

Figure 7A:
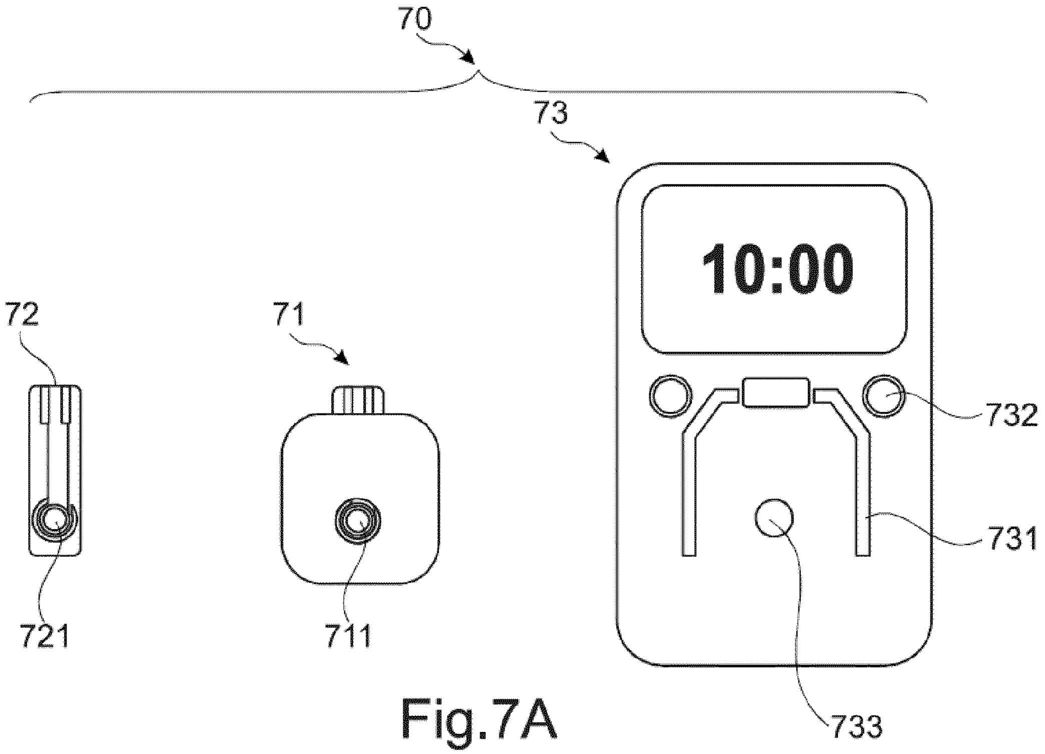
FIG. 7A shows an example assay system.
Figure 7B:
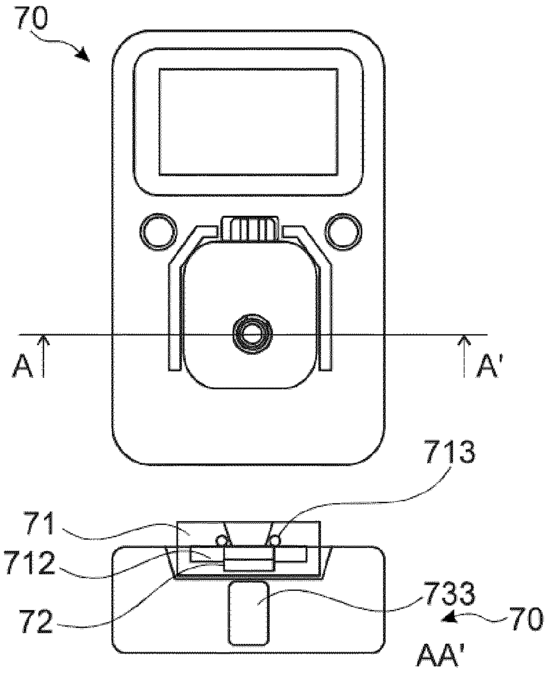
FIG. 7B shows a plan view of the assay system and a side view of the assay system cut by line AA'.

FIG. 7A shows an assay system 70 which comprises a device or cartridge 71 comprising all or any of the example features described in this disclosure. The assay system comprises an electrode 72, a reader 73 configured to read the electrode 72 and a magnet 733 comprised in the reader. The cartridge or device 71 comprises an electrode receiving slot (not shown) in which the electrode 72 appears inserted. As seen, the part 721 of the electrode comprising the contacts of the electrode 72 may be inserted and may be fixed under the second opening 711 in such a way that if a liquid is verted into a chamber through a first opening of the cartridge or device, the liquid contacts the electrode part 721 through a second opening. As an example, the electrode may be a Screen-Printed electrode suitable for working with micro-volumes or by dipping them in solution. These electrodes may perform well for decentralized assays or to develop biosensors with electrochemical readout. The electrochemical cell may comprise a working and an auxiliary electrode, where the working electrode may be made of carbon and the auxiliary electrode may be made of silver or silver chloride. The electrodes may be built on a ceramic or plastic substrate. The electrode may comprise other transducer mechanisms besides electrochemical, including optical, electronic, piezoelectric, gravimetric, pyroelectric, magnetic, among others. The cartridge or device 71 may be disposable. The cartridge or device 71 does neither comprise a magnet-slot nor a magnet, reducing the weight and cost of the disposable cartridge or device 71. The reader 73 may comprise a screen or display showing, for example: measurement potential, current ranges obtained during the measurement, acquisition time, stabilization time. The reader 73 may further comprise an interface for communication with a device, for example a wireless interface for communication with a smartphone. The reader 73 may also comprise at least one of the following features: a cartridge or device receiving slot 731, control buttons 732 and a magnet-slot comprising a magnet 733. The reader may comprise a communication interface (not shown) for communicating with a device. FIG. 7B shows a plan view of the assay system 70 and a side view of the assay system 70 cut by line AA'.

Figure 8:
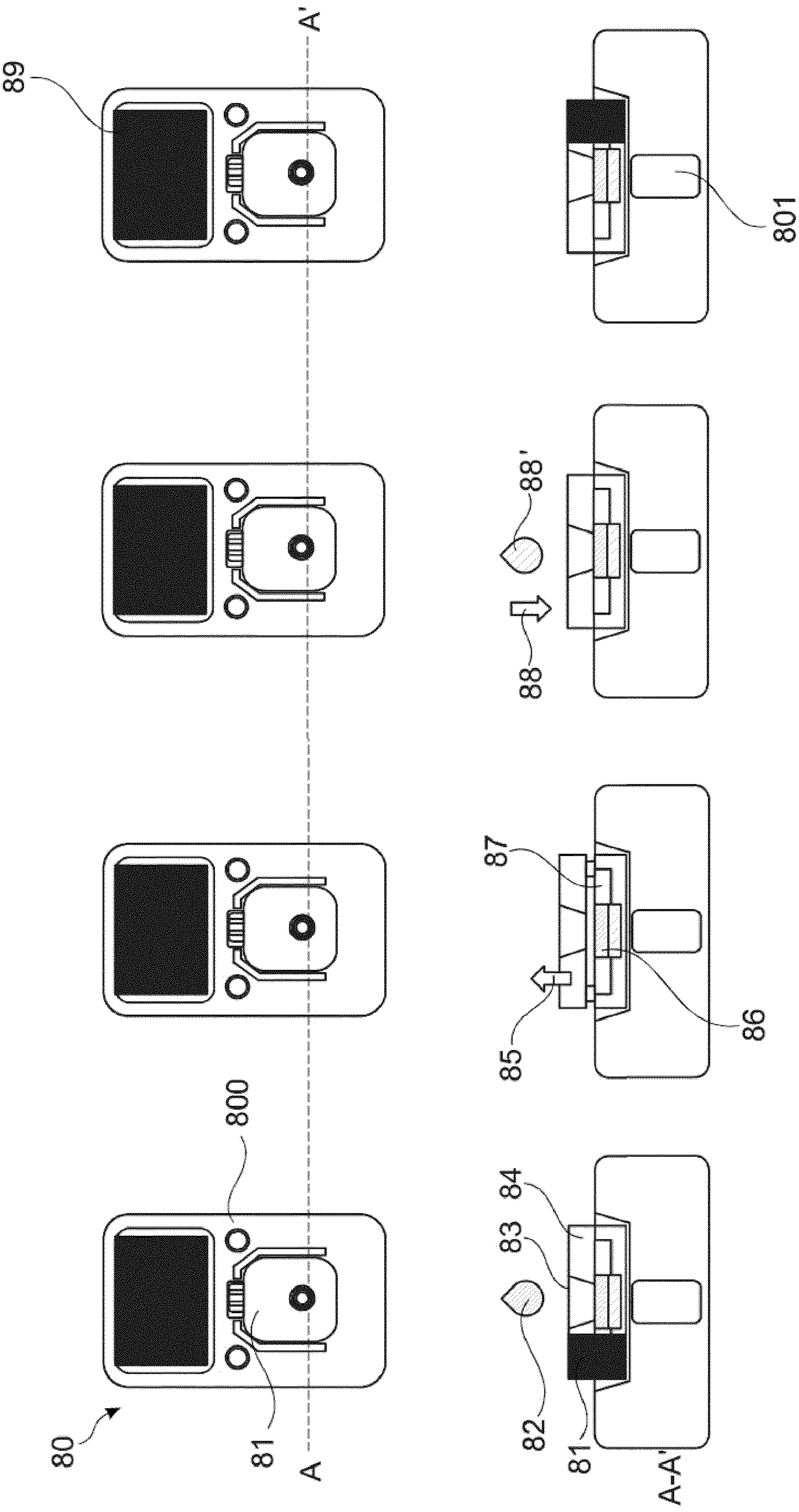
FIG. 8 shows an example of a method of the present disclosure.

A method for performing an assay or in vitro test may be implemented with any of the cartridge or device described in the present disclosure. FIG. 8 shows an example of a method, wherein the following steps are represented in different figures from left to right in FIG. 8. The method comprises:

- providing an assay system 80;
- providing the device or cartridge 81 in the closed position;
- adding a sample 82 to be analyzed through the first opening 83 into the chamber 84, wherein at least part of the sample is in a liquid state;
- shifting 85 the device or cartridge 81 to the open position, where at least a part of the liquid exit 86 is uncovered by the sealing element and a fluidic path is formed between the chamber and the liquid absorbing pad 87 through the uncovered part of the liquid exit;
- letting the liquid part of the sample flow through the fluidic path to be at least partially removed by the liquid absorbing pad;
- shifting 88 the device to the closed position;
- adding a readout reagent 88' into the chamber;
- reading 89 the resulting sample by an electrode reader.

In examples, the sample comprises magnetic particles and the step of letting the liquid part of the sample flow through the fluidic path to be at least partially removed by the liquid absorbing pad is performed while the magnetic particles are attracted by a magnet 801. In some examples, after adding a sample 82 and before shifting 85 the device or cartridge to the open position, a washing buffer is added for washing the sample in the chamber.

Figure 9:
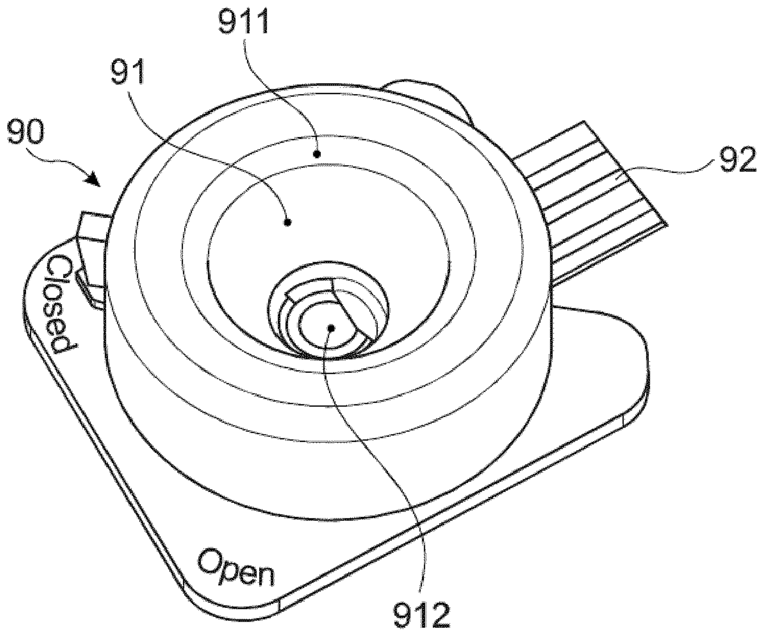
FIG. 9 shows an example device or cartridge 90.

FIG. 9 shows an example device or cartridge 90 comprising all or any of the example features described in this disclosure. The figure shows the cartridge 90 with an electrode 92 inserted through an electrode receiving slot. The inserted part of the electrode may be seen through the second opening 912 of the chamber 91. Liquids may be inserted into the chamber 91 through the first opening 911 and fall by gravity, in the upright position, to the second opening 912 where they enter into contact with the electrode 92. A magnet (not shown) located under the electrode may attract magnetic particles and retain them in an open position so that a liquid may be absorbed by an absorbing pad (not shown).

Figure 10:
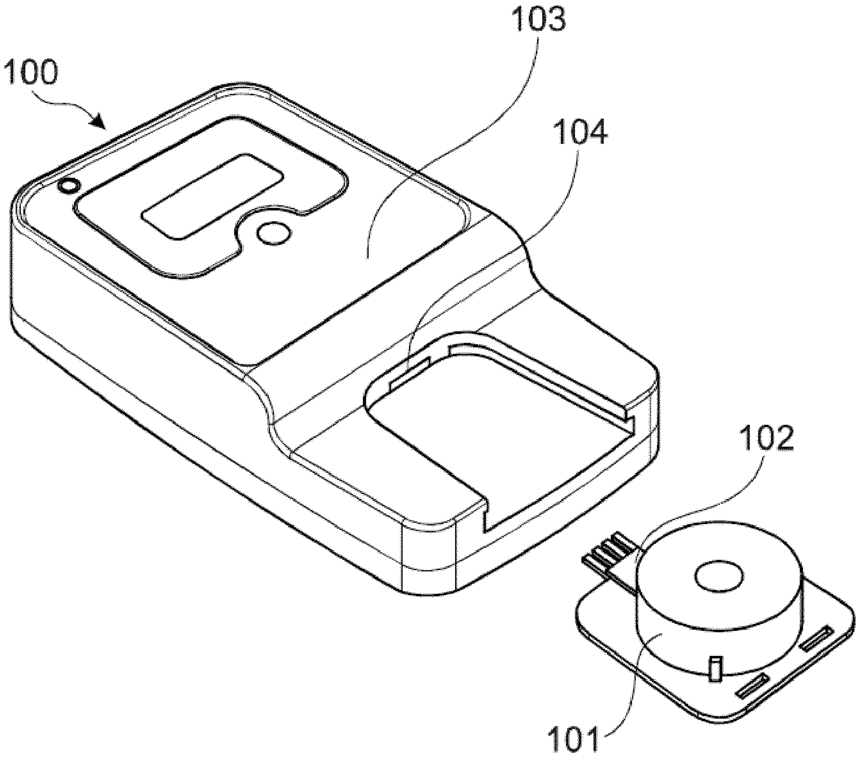
FIG. 10 shows an example assay system 100.

FIG. 10 shows an example assay system 100 which comprises a device or cartridge 101 comprising an electrode 102, the assay system comprising a reader 103 configured to read the electrode 102, which may be inserted into an electrode slot 104 provided in the reader 103.

In some examples, an electrode may be permanently integrated into the device o cartridge in a position adjacent to the chamber, such that, in use, when the sample or liquids are inserted into the chamber, the sample or liquids fall by the force of gravity towards the electrode. For example, the electrode may be attached by an adhesive material or similar, or a screen-printed electrode may be used. In these cases, the device or cartridge may be disposable.

In some cases, an electrode may comprise any immobilized molecular or biological receptor, i.e., peptide, antibody, DNA, oligonucleotide or any other molecule which is capable of specifically react or attach a biomarker or a target in the sample. In such cases, the addition of the sample into the chamber is performed with the device or cartridge in the closed position. After a predefined time, the molecular or biological receptor in the electrode may be attached or reacted with the analyte or target, making possible the opening of the device or cartridge for washing and removing the excess of reagents without the risk of having the compound of interest flowing towards the absorbing pad and absorbed therein.

For reasons of completeness, various aspects of the present disclosure are set out in the following numbered clauses:

Clause 1. A device (10, 20, 30, 40, 50, 60, 71, 81) for performing an assay, the device comprising

- a chamber (11, 22, 411, 54, 84) comprising
  - a first opening (111, 83) for adding magnetic particles and liquids (45, 61, 82) into the chamber,
  - and a second opening (112, 512, 64, 711) for letting the magnetic particles and liquids contact an electrode adjacent to the chamber;
- a liquid exit (15, 43, 86) for letting the liquid exit the chamber;
- a liquid absorbing pad (13, 25, 421, 87) adjacent to the chamber;
- an opening assembly (14, 26, 46) for shifting the device between a closed position and an open position,
- a sealing element (12, 23, 412) for sealing the liquid exit (15, 43, 86);
- wherein:
- in the closed position the sealing element (12, 23, 412) covers the liquid exit (15, 43, 86) such that a liquid is prevented from flowing out of the chamber (11, 22, 411, 54, 84) through the liquid exit (15, 43, 86);
- and in the open position:
  - at least part of the liquid exit is uncovered by the sealing element (12, 23, 412) and
  - the device comprises a fluidic path (16, 44) between the chamber (11, 22, 411, 54, 84) and the liquid absorbing pad (13, 25, 421, 87) through the uncovered part of the liquid exit (15, 43, 86).

Clause 2. A device (10, 20, 30, 40, 50, 60, 71, 81) according to clause 1 wherein:

- a first cover (21, 31, 41, 51) comprises the chamber (11, 22, 411, 54, 84) and the sealing element (12, 23, 412);
- the first cover fits a second cover (24, 32, 42, 52);
- the second cover comprises the liquid absorbing pad (13, 25, 421, 87);
- the liquid absorbing pad faces at least part of the liquid exit (15, 43, 86) of the chamber in the open position;
- and the opening assembly (14, 26, 46) comprises a first cooperating mechanism (33, 461, 511) and a second cooperating mechanism (34, 452, 521) wherein the first cover (21, 31, 41, 51) comprises the first cooperating mechanism (33) and the second cover (18, 32) comprises the second cooperating mechanism (34).

Clause 3. The device of clause 2 wherein the first cooperating mechanism (33, 461, 511) and the second cooperating mechanism (34, 452, 521) are moveable relative to each other such that the first cover and the second cover are movable relative to each other to shift between the closed position and the open position.

Clause 4. The device of clause 2 or 3 wherein the first cooperating mechanism (33, 461, 511) and the second cooperating mechanism (34, 452, 521) form a threaded coupling such that one of the second cover or the first cover is threaded onto the first cover or the second cover and unthreaded from the first cover or from the second cover to shift between a closed position and an open position.

Clause 5. The device of any of clauses 1 to 4 further comprising an electrode receiving slot (53, 62) adjacent to the chamber in a position where, when the chamber comprises a liquid, the liquid is enabled, under the force of gravity, to flow through the second opening towards the electrode receiving slot.

Clause 6. A device according to any of clauses 1 to 5 further comprising a magnet-slot (63) next to the chamber in a position where, when the chamber comprises a magnetic particle and a magnet is positioned in the magnet-slot (63), the magnetic particle is enabled, under a magnetic field generated by the magnet, to move through the second opening towards the magnet.

Clause 7. An assay system (70, 80) comprising:

a device or cartridge according to any of clauses 1 to 6, an electrode (72).

Clause 8. An assay system (70, 80) according to clause 7 further comprising a magnet (733).

Clause 9. An assay system (70, 80) according to clause 7 or 8 further comprising a reader (73, 801) configured to read the electrode.

Clause 10. An assay system (70, 80) according to any of clauses 7 to 9 further comprising a communication interface for communicating with a device.

Clause 11. A method for performing an assay or in vitro test, the method comprising at least the following steps:

providing an assay system (70, 80) according to any one of clauses 7 to 10;

providing the device (10, 20, 30, 40, 50, 60, 71, 81) in the closed position;

adding a sample to be analyzed through the first opening into the chamber, wherein at least part of the sample is in a liquid state;

shifting the device to the open position, where at least a part of the liquid exit is uncovered by the sealing element and a fluidic path is formed between the chamber and the liquid absorbing pad through the uncovered part of the liquid exit;

letting the liquid part of the sample flow through the fluidic path to be at least partially removed by the liquid absorbing pad;

shifting the device to the closed position;

adding a readout reagent into the chamber;

reading the resulting sample by an electrode reader.

Clause 12. The method of clause 11 when the clause 11 depends on clause 8, wherein the sample comprises magnetic particles and the step of letting the liquid part of the sample flow through the fluidic path to be at least partially removed by the liquid absorbing pad is performed while the particles are attracted by a magnet.

Clause 13. A method according to clause 10 or 11 further comprising, after adding a sample and before shifting the device to the open position adding a washing buffer for washing the sample in the chamber.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

What is claimed is:

1. A device for performing an assay, the device comprising an electrode;

a first cover comprising a chamber comprising a first opening for adding magnetic particles and liquids into the chamber, and a second opening for letting the magnetic particles and liquids contact the electrode placed in the device adjacent to the chamber;

and a sealing element;

a second cover fitting the first cover, the second cover comprising a liquid absorbing pad adjacent to the chamber;

a liquid exit for letting the liquid exit the chamber;

an opening assembly for shifting the device between a closed position and an open position, the opening assembly comprising a first cooperating mechanism and a second cooperating mechanism wherein the first cover comprises the first cooperating mechanism and the second cover comprises the second cooperating mechanism;

wherein:

the sealing element is configured to seal the liquid exit;

the liquid absorbing pad faces at least part of the liquid exit of the chamber in the open position of the device;

and wherein:

in the closed position, the sealing element covers the liquid exit such that a liquid is prevented from flowing out of the chamber through the liquid exit;

and in the open position, at least part of the liquid exit is uncovered by the sealing element and the device comprises a fluidic path between the chamber and the liquid absorbing pad through the uncovered part of the liquid exit.

2. The device of claim 1 wherein the first cooperating mechanism and the second cooperating mechanism are moveable relative to each other such that the first cover and the second cover are movable relative to each other to shift between the closed position and the open position.

3. The device of claim 1 wherein the first cooperating mechanism and the second cooperating mechanism form a threaded coupling such that one of the second cover or the first cover is threaded onto the first cover or the second cover and unthreaded from the first cover or from the second cover to shift between a closed position and an open position.

4. The device of claim 1, further comprising an electrode receiving slot adjacent to the chamber in a position where, when the chamber comprises a liquid, the liquid is enabled, under the force of gravity, to flow through the second opening towards the electrode receiving slot.

5. The device according to claim 1, further comprising a magnet-slot next to the chamber, the magnet-slot configured in a position where, when the chamber comprises a magnetic particle and a magnet is positioned in the magnet-slot, the magnetic particle is enabled, under a magnetic field generated by the magnet, to move through the second opening towards the magnet.

6. An assay system comprising:

a device or cartridge according to claim 1, and a reader configured to read the electrode.

7. The assay system of claim 6, further comprising a magnet.

8. The assay system of claim 6, further comprising a communication interface for communicating with a device.

9. A method for performing an assay or in vitro test, the method comprising the following steps:
providing an assay system according to claim 7;
providing the device in the closed position;
adding a sample to be analyzed through the first opening into the chamber, wherein at least part of the sample is in a liquid state;
shifting the device to the open position, where at least a part of the liquid exit is uncovered by the sealing element and a fluidic path is formed between the chamber and the liquid absorbing pad through the uncovered part of the liquid exit;
letting the liquid part of the sample flow through the fluidic path to be at least partially removed by the liquid absorbing pad;
shifting the device to the closed position;
adding a readout reagent into the chamber;
reading the resulting sample by an electrode reader.

10. The method of claim 9, further comprising attracting magnetic particles in the sample by a magnet while the liquid part of the sample flows through the fluidic path.

11. The method according to claim 9, further comprising, after adding a sample and before shifting the device to the open position, adding a washing buffer for washing the sample in the chamber.

12. The device of claim 1 wherein the electrode is a screen-printed electrode.

13. The device of claim 1 wherein the electrode is permanently integrated into the device in a position adjacent to the chamber in a position where, when the chamber comprises a liquid, the liquid is enabled, under the force of gravity, to flow through the second opening towards the electrode.

14. The device of claim 1 wherein the device is a single use device.

15. The device of claim 1 wherein the liquid exit is a hole or cavity formed between the first cover and the second cover in the open position.

16. The device of claim 2 wherein the first cooperating mechanism comprises a first locking tab and the second cooperating mechanism comprises a second locking tab such that the first cover is raised up from the second cover to fix the first cover in the open position, and the first cover is lower down towards the second cover to fix the first cover in the closed position.

17. The device of claim 3 wherein the threaded coupling comprises a helical groove and a protrusion sliding along the groove.

18. The device of claim 4 wherein the electrode receiving slot is positioned in a position below the chamber when the device is in a standing or upright position.

19. The device of claim 5 wherein the magnet slot is positioned in a position below an electrode receiving slot which in turn is positioned in a position below the chamber when the device is in a standing or upright position.

20. The assay system of claim 8 wherein the communication interface comprises a USB cable or a wireless interface for communicating with a portable device, such as a tablet of smartphone configured to receive measurements from the reader.

* * * * *